G. W. EDDY.
Stop-Cocks.
No. 139,559. Patented June 3, 1873.
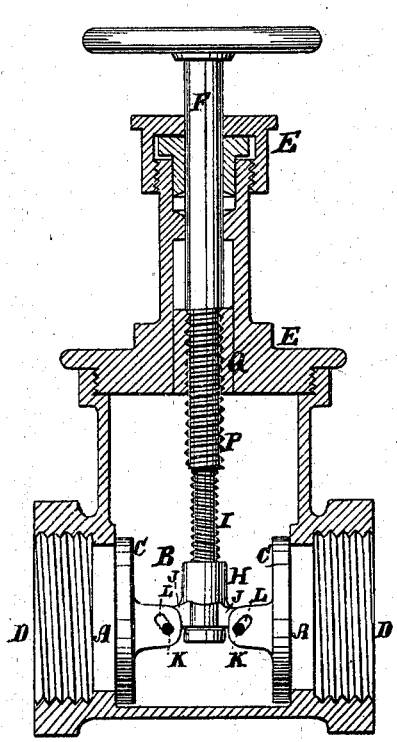
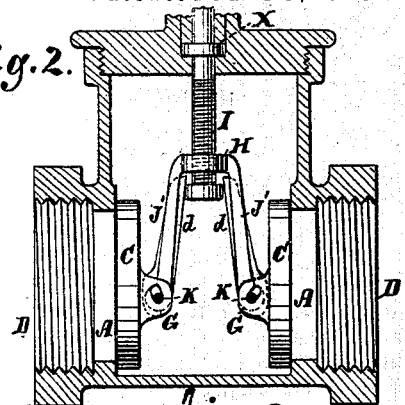
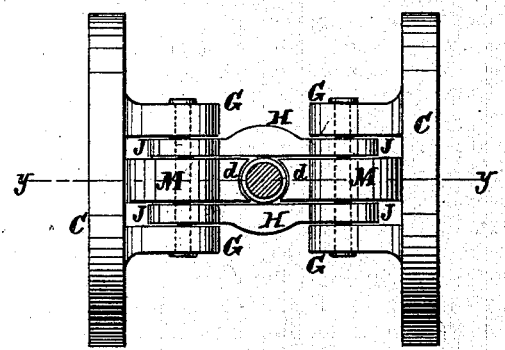
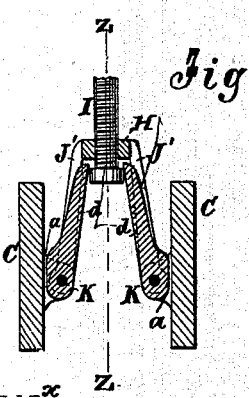
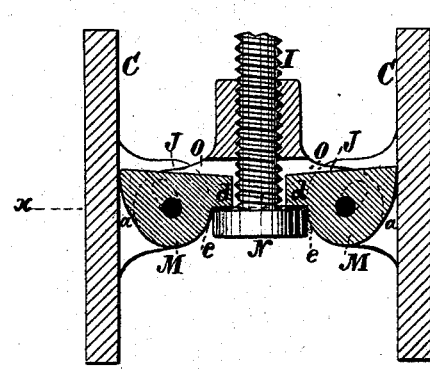
Witnesses:
A. Bennerkendorf
C. Sedgwick
Inventor:
G. W. Eddy
Per
Attorneys

UNITED STATES PATENT OFFICE.

GEORGE W. EDDY, OF WATERFORD, NEW YORK.

IMPROVEMENT IN STOP-COCKS.

Specification forming part of Letters Patent No. 139,559, dated June 3, 1873; application filed March 8, 1873.

*To all whom it may concern:*

Be it known that I, GEORGE W. EDDY, of of Waterford, in the county of Saratoga and State of New York, have invented a new and Improved Stop-Valve, of which the following is a specification:

The invention consists in the improvement of stop-valves, as hereinafter described and pointed out in the claims.

Figure 1 is a sectional elevation of the shell and pipe connection of my improved stop-valve, showing the arrangement when the stem works up and down or in and out in working the disks. Fig. 2 is a similar section, showing the arrangement when the stem does not have endwise motion. Fig. 3 is a plan view of the disks and the device for operating them, as represented in Fig. 1, reversed, except the stem, which is shown in section on the line $x\,x$ of Fig. 4. Fig. 4 is a sectional elevation of Fig. 3 on the line $y\,y$. Fig. 5 is a section of the disks, cross-head, and levers as represented in Fig. 2; and Fig. 6 is a section of Fig. 5 on the line $z\,z$.

Similar letters of reference indicate corresponding parts.

A represents the two valve-seats on opposite sides of the valve-chamber B, and C the disks or valves for closing the passage through said chamber by the pipe-connection D. E is the stuffing-box at the top of the chamber, and F the valve-stem, entering the chamber through said stuffing-box to actuate the valves, all of which, as thus far described, are similar to the other stop-valves of this character, the stem being arranged in one case to screw in and out of the chamber through nut Q for opening and closing the valves, and in another case arranged with a collar, X, so as not to have end motion, the valves being opened and closed by screwing forward and back on the stem. I propose to pivot these disks by ears G, or other equivalent devices, to a cross-head or nut, H, which screws up and down on the part I of the valve-stem— say, by left-hand screw-threads when the stem screws in and out—and I arrange the pivot-pins K in inclined slotted or elongated or enlarged round holes L, which are so inclined that when the disks cease their downward movement the further down movement of the cross-head will, by the action of the pivots on the inclines of the holes, force the disks against their seats, and at the beginning of the up movement draw them away from the seats.

It is immaterial, so far as the arrangement thus described is concerned, whether the inclined slots be in the ears of the disks and the pivot-pins on the cross-heads, or vice versa; but for the application of the cams or dogs M, which I propose to use as auxiliary to the said slots and pivots for pressing the disks on their seats with greater force, it is better to have the slots and pivot-pins arranged as represented in the drawings.

These cams or dogs are pivoted to the cross-head on the same pins K that are used for pivoting the disks to the cross-head, and have an eccentric face, $a$, acting on the back of the disks, and a stem or lever projection, $d$, extending to within a short distance of the valve-stem L, so as to be acted on by a collar, N, or any equivalent enlargement, on its lower end, so that when the cross-head is screwed down on the stem till the stems $d$ of the cams are brought against the collar, it will, by its action on said stems, force the cam-faces powerfully against the disks, and thus greatly aid the pivot-pins and the slots in pressing the disks against their seats, both to close them tightly and to strongly resist any impulses of the water against them, which are sometimes very great when the water is suddenly stopped, from flowing at other valves, and the like.

When I choose to arrange the stem, as in Fig. 1, to screw in and out of the chamber for working the valves, I will have short ears or projections J on the cross-head for pivoting the disks to, and the stems $d$ of the cams will be correspondingly short, because the collar on the stem will extend down to the middle of the disks when they are down; but when I prefer to have the stem fixed so as not to have end motion, and have the lower end terminate above the water-way, so as not to obstruct the water, I will have these ears take the form of arms J', in Figs. 2, 5, and 6, and extend down from the nut or cross-head enough to let the disks down from the end of the stem above the water-way, and the stems $d$ of the cams will be correspondingly lengthened to reach up to the collar; but in all other respects the construction will be the same and the operation will be the same.

To relieve the pivots K of the force by which these cams are pressed against the disks, I propose, when the arrangement is as in Fig. 1, to so arrange them at *e* relatively to the the collar that the end thrust will be received on the collar by the part *e*, which rolls against the collar as it rises. This part *e* of the cams may be a little eccentric, and they may have enlarged or slotted holes for the pins or bolts K, so that besides acting on the disks by their eccentric faces *a*, they may also have a little end motion too; or they may have concentric faces at *a*, and be altogether caused to press against the disks by eccentric faces at *e*, acted on by the collar. Thus it will be seen that either of these arrangements may be used separately or in combination. The cams are arranged in slots O in the cross-head, by which they are placed in the plane of the axis of the disks and the valve-stem; but they may be slotted and embrace a tenon or ear-shaped piece projecting from the center of the end of the cross-head. P represents the right-hand threaded part of the stem, which screws through the nut Q in the cap below the stuffing-box when the stem has endwise motion, to raise the lower end of the stem above the water-way when the valves are open, and return it to the working position when the valves are closed, while the raising and lowering of the disks with the cross-head are effected by the stem, by reason of the reversely-threaded part I, which moves the cross-head down by the same movement that screws the stem down, and up by the same movement that raises the stem, thus enabling me to have the stem screw in and out to work the valves, which is sometimes preferable, and at the same time to avail myself of the collar on the stem for working the cams, and yet not having the water-way encumbered by it when the valve is opened.

This double-acting screw arrangement is only needed when it is desirable to raise the stem out of the water-way when the valves are open.

Having thus described my invention, I claim as new and desire to secure by Letters Patent—

1. The right and left screw P I, the cross-head H, and the disks combined, constructed and operating together in the manner and for the purpose described.

2. The combination of disks C C having obliquely-slotted ears G G, with cross-head H having pivot-pins K K, as and for the purpose set forth.

3. The combination of cams M *d*, slotted cross-head H, and stem-disk N, as and for the purpose specified.

GEO. W. EDDY.

Witnesses:
A. P. THAYER,
T. B. MOSHER.